(12) United States Patent
Trusov et al.

(10) Patent No.: US 9,274,136 B2
(45) Date of Patent: Mar. 1, 2016

(54) MULTI-AXIS CHIP-SCALE MEMS INERTIAL MEASUREMENT UNIT (IMU) BASED ON FREQUENCY MODULATION

(71) Applicant: The Regents of the University of California, Oakland, CA (US)

(72) Inventors: Alexander A. Trusov, Irvine, CA (US);
Sergei A. Zotov, Irvine, CA (US);
Andrei M. Shkel, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 393 days.

(21) Appl. No.: 13/752,044

(22) Filed: Jan. 28, 2013

(65) Prior Publication Data
US 2014/0208823 A1    Jul. 31, 2014

(51) Int. Cl.
*G01P 15/097*    (2006.01)
*G01P 21/00*    (2006.01)
*G01P 15/125*    (2006.01)
*G01P 15/18*    (2013.01)
*G01C 19/5783*    (2012.01)

(52) U.S. Cl.
CPC ............ *G01P 21/00* (2013.01); *G01C 19/5783* (2013.01); *G01P 15/097* (2013.01); *G01P 15/125* (2013.01); *G01P 15/18* (2013.01)

(58) Field of Classification Search
CPC .............................. G01P 15/097; G01P 1/023
USPC ................................................. 73/514.29, 493
See application file for complete search history.

(56) References Cited

U.S. PATENT DOCUMENTS

| 5,379,639 A * | 1/1995 | Hulsing et al. ............. 73/514.29 |
| 2009/0007661 A1* | 1/2009 | Nasiri et al. ............... 73/504.03 |
| 2013/0019682 A1* | 1/2013 | Hsu ........................... 73/514.01 |

* cited by examiner

*Primary Examiner* — John Chapman, Jr.
(74) *Attorney, Agent, or Firm* — Marcus C. Dawes; Daniel L. Dawes

(57) ABSTRACT

A multi-axis microelectromechanical-systems (MEMS) inertial measurement unit (IMU) is fabricated in a vacuum sealed single packaged device. An FM vibratory gyroscope and an FM resonant accelerometer both for generating FM output signals is fabricated in the silicon chip using MEMS. A signal processor is coupled to the an FM vibratory gyroscope and to the FM resonant accelerometer for receiving the FM gyroscopic output signals and the FM accelerometer output signals. The signal processor generates simultaneous and decoupled measurement of input acceleration, input rotation rate, and temperature and/or temperature distribution within the IMU, self-calibration of the biases and scale factors of the IMU and its support electronics against temperature variations and other common mode errors, and reduction of the cross axis sensitivity by reducing acceleration errors in the gyroscope and rotation errors in the accelerometer.

9 Claims, 11 Drawing Sheets

MULTI-AXIS CHIP-SCALE MEMS INERTIAL MEASUREMENT UNIT (IMU) BASED ON FREQUENCY MODULATION

GOVERNMENT RIGHTS

This invention was made with government support under Grant No. N00014-11-1-0483 awarded by the Office of Naval Research. The government has certain rights in the invention.

BACKGROUND

1. Field of the Technology

The disclosure relates to the field of multi-axis MEMS inertial measurement units (IMU) and in particular to units that exhibit temperature and vibration immunity, which are inherently quasi-digital, have ultra-high precision, stability, and wide dynamic range and wide measurement bandwidth.

2. Description of the Prior Art

All inertial measurement units (IMUs) are based on a combination of inertial sensors such as gyroscopes and accelerometers. The performance parameters of an IMU are defined by the parameters of the individual inertial sensors, as well as the method of processing the individual measurements together. Current MEMS IMUs do not meet the navigation grade requirements, and very few systems are reaching the tactical grade due to limitations in temperature and vibration sensitivity, signal stability, resolution, dynamic range, and bandwidth.

Conventional methods to create a compact MEMS IMU fail into three general regimes. The most common approach is to use off-the-shelf single-axis sensors mounted onto printed circuit boards (PCBs) and assembled into a three dimensional configuration. Single-axis sensors optimized to reject off-axis inputs are typically used, benefiting the overall IMU performance compared to using multi-axis sensors with a single proof mass. The approach is also well supported by the mature PCB technology. This approach does not allow further miniaturization and cost reduction since individual dies have to be fabricated, packaged, and tested separately. Also, conventional sensors based on analog amplitude modulation do not provide the necessary stability and immunity to vibration and temperature.

Another emerging but conventional method for creating micro IMUs involves chip-stacking. Each sensor is fabricated independently and then known-good dies are stacked together onto a single chip. In comparison to the PCB and common substrate approaches, the overall size of the IMU is reduced to a smaller footprint. However, for both methods alignment errors will vary for each device due to temperature, ambient vibrations, shock, accelerations, life span of IMU, limiting the effectiveness of factory calibration. This method also suffers from the inherent limitations of the conventional MEMS sensors operating based on analog amplitude modulation of signals.

A third alternative conventional method used to create a chip-level IMU is to fabricate all sensors onto a single die. This allows the footprint of the system as a whole to be small enough for chip-level packaging. Despite these advantages, there are significant drawbacks to this IMU architecture. First, creating conventional gyroscope(s) and accelerometer(s) requires very different packaging parameters. High precision gyroscope required high vacuum for operation; at the same time, accelerometers operate at atmospheric or above atmospheric pressure to provide the necessary bandwidth. This fundamental difference between packaging of high performance MEMS gyroscopes and accelerometers makes true co-fabrication and co-packaging impossible, preventing true integration.

All commercially available silicon MEMS gyroscopes and accelerometers rely on amplitude modulation of the input stimulus, where the inertial input produces a proportional change in the sensor output voltage. In other words, the inertial input is amplitude modulated. In this approach, the final output signal of a sensor is proportional to the true input, as well as a number of device parameters, including the stiffness of the spring, pick-up electronics gain, and so on. These additional contributors to the sensor bias and scale factor require calibration of each individual sensor. Variation of these internal parameters with time and with varying environment produces unpredictable drifts in the sensor output.

Another inherent disadvantage of conventional MEMS sensors using amplitude modulated signals comes from the limited dynamic range (the ratio between the full scale linear range and the smallest useful signal). In the best case scenario, AM capacitive readout with preselected low-noise electronic components can only achieve a resolution of $1\times10^{-6}$ of the full scale, with a practical limit of $1\times10^{-5}$. This means that achieving a $10^6$ dynamic range and 1 ppm stability (requirement of the navigation grade) is practically impossible with conventional MEMS sensors. These fundamental limitations on the dynamic range and output stability prevent the use of MEMS gyroscopes and accelerometers in many important applications. AM architecture of sensors also presents tradeoffs between sensor noise and bandwidth (classic gain vs. bandwidth tradeoff of analog AM systems). The conventional AM based inertial sensor operation is also sensitive to temperature, resulting in significant response drifts over ambient temperature and pressure variations. The stability of the analogue signal reference is limited by $10^{-6}$, that fact creates irresolvable limitations on the AM devices stability.

For gyroscopes in particular, mode matching of high-Q angular rate gyroscopes increases the signal-to noise-ratio at the tradeoff of linear range and measurement bandwidth (10 deg/s range, sub-Hz bandwidth typical for Q~100 k). These constraints stem from a fundamental Q versus bandwidth tradeoff and dynamic range limitations of analog amplitude modulation (AM) systems (in conventional MEMS gyroscopes, the sense-mode response is excited by the input angular rate amplitude-modulated by the drive-mode velocity). The conventional AM based gyroscopes operation is also sensitive to the value of the sense-mode Q-factor, resulting in significant response drifts over ambient temperature and pressure variations.

At the same time, the conventional AM type accelerometer must have very low Q-factor (single digit values—100,000 less than Q of a gyroscope) to provide bandwidth, which requires encapsulating it in air or high pressure. The fact that conventional MEMS gyroscopes are inherently resonant devices while conventional MEMS accelerometers are inherently non-resonant devices makes it impossible to truly integrate them together. As a result conventional wide bandwidth, high precision accelerometers and gyroscopes are fabricated separately.

In response to the foregoing problems a frequency modulated accelerometer has been proposed in the art, where induced acceleration changes the resonant frequency of the device due to changes in the total effective stiffness (combination of positive mechanical stiffness and negative electrostatic spring). The main challenge to overcome in this approach is temperature sensitivity of the resonant frequency, caused by the dependency of the silicon's Young's modulus on temperature.

BRIEF SUMMARY

The disclosed temperature and vibration immune, inherently quasi-digital, multi-axis MEMS inertial measurement unit (IMU), has ultra-high precision, stability, and wide dynamic range and wide measurement bandwidth. The IMU is based upon frequency modulated (FM) accelerometers and gyroscopes. Due to the inherent FM nature of the IMU, it provides a resolution and stability unprecedented in conventional inertial MEMS devices. The disclosed IMU provides a unique differential frequency measurement technique and enables simultaneous detection (and decoupling) of the true inertial inputs (angular rate and acceleration) as well as the temperature distribution across the chip-scale system. In this approach, the IMU becomes its own thermometer, eliminating the commonplace need for thermal calibration and issues with thermal lags and hysteresis. Also, the disclosed architecture is robust against mechanical and electromagnetic interferences due to the inherent advantages of frequency modulated signals (quasi-digital) compared to amplitude modulated signals (analog). An availability of high stable references of frequency enables to achieve stability of $10^{-9}$ in the FM system, providing a 1000 times improvement over the state-of-the-art conventional AM gyroscopes with capacitive pick-off.

A proof of concept single-chip it implementation of the disclosed IMU is described, combining an ultra-high Q-factor FM gyroscope cofabricated with a complementary high-resolution FM accelerometer. Embedded accelerometers enable reduction of vibration and acceleration induced errors in the gyroscope by using feedback compensation. Prototypes of the new FM IMU were designed, implemented, and fabricated using an in-house, wafer scale silicon-on-insulator (SOI) bulk micromachining process, and experimentally characterized. Temperature characterization of the FM gyroscope exhibited less than 0.2% variation of the angular rate response between 25° C. and 70° C. environments, enabled by the self-calibrating differential frequency detection. High-speed rate table characterization of the FM angular rate sensor demonstrated a linear range of 18 000 deg/s (50 revolution/s, limited by the test setup) with a dynamic range of 156 dB. Characterization of the FM accelerometer revealed linear dynamic range of 1 g (limited by the test setup), with a linear fit R-squared value of 0.996. Temperature characterization of the FM accelerometer showed less than 0.5% scale-factor change between 30° C. and 75° C. temperatures, without any compensation, enabled by the self-calibrating differential frequency detection. Characterization of the 2.2 kHz resonator structure which serves as the basic building block for the FM sensors demonstrated a frequency stability of 0.15 ppb at 300 seconds with frequency white noise of 1.5 ppb/'Hz. Using the measured scale factor of 4 Hz/g, we project that the FM IMU can achieve an acceleration bias instability of less than 0.1 µg and a velocity random walk of less than 1 µg/√Hz.

The invention is more generally directed to a multi-axis microelectromechanical-systems (MEMS) inertial measurement unit (IMU) in a vacuum sealed single packaged device. The MEMS IMU includes a single silicon chip, an FM vibratory gyroscope for generating frequency modulated (FM) gyroscopic output signals fabricated in the silicon chip using silicon MEMS technologies as part of the vacuum sealed single packaged device, an FM resonant accelerometer for generating frequency modulated (FM) accelerometer output signals fabricated in the silicon chip using silicon MEMS technologies as part of the vacuum sealed single packaged device, and a signal processor coupled to the an FM vibratory gyroscope and to the FM resonant accelerometer for receiving the frequency modulated (FM) gyroscopic output signals and the frequency modulated (FM) accelerometer output signals. The signal processor generates simultaneous and decoupled measurement of input acceleration, input rotation rate, and temperature and/or temperature distribution within the IMU, self-calibration of the biases and scale factors of the IMU and its support electronics against temperature variations and other common mode errors, and reduction of the cross axis sensitivity by reducing acceleration errors in the gyroscope and rotation errors in the accelerometer.

The FM vibratory gyroscope generates a differential FM signal including two splitting frequencies with inherent self-calibration against temperature and other common mode errors, where the sum of the two splitting frequencies is proportional to the sensor temperature and the difference between the two splitting frequencies provides a measure of the input rate of rotation.

The FM resonant accelerometer generates a differential FM signal including two splitting frequencies with inherent self-calibration against temperature and other common mode errors, where the sum of the two splitting frequencies is proportional to the sensor temperature and the difference between the two splitting frequencies is a measure of the input rate of acceleration.

The FM resonant accelerometer includes a tuning fork resonator having two tines with two degrees of freedom, such as an anti-phase and in-phase mode of vibration of the two tines. A variable gap parallel plate electrodes is coupled to the two tines to produce a negative electrostatic spring, where external acceleration causes a shift of both tines with in-phase motion, which changes an effective gap in the parallel plate electrodes thereby changing the effective stiffness for each tine, where the change of stiffness induces a change of an anti-phase resonant frequency, and where the change of the anti-phase resonant frequency is an FM measure of the input acceleration.

The accelerometer includes two sets of variable gap parallel plate electrodes having opposite orientations so that interchangeable operation of the two sets of parallel plate electrodes reverses the polarity of an accelerometer scale factor, enabling self-calibration of bias drift by means of a differential measurement arising from the interchangeable operation of the two sets of parallel plate electrodes.

The two tines are momentum balanced so that the anti-phase mode of vibration generates quality factors above 1,000,000 and frequency stability below 1 ppb, enabling very good FM detection resolution and stability for the gyroscope and accelerometer.

The in-phase mode of vibration of the accelerometer is arranged and configured to have a lower quality factor (for example below 1,000) by providing energy dissipation through the chip or through the use of a feedback system to provide wide bandwidth and fast response time.

The FM accelerometer includes two tuning forks, each of the two tuning forks having the same sensitive axis, which is the axis of the anti-phase mode vibrations, but polar opposite scale factors by reversed orientation of the negative electrostatic spring produced by the parallel plate electrodes, where simultaneous and coordinated operation of the two tuning forks yields a differential FM accelerometer in which the two output frequencies are used to detect acceleration and sensor temperature at the same time, and to eliminate the effect of temperature and other common mode errors on the accelerometer output.

The FM gyroscope and FM accelerometer include separate x, y, z single-axis sensors or combination sensors with multiple axis of rotation sensitivity or acceleration sensitivity.

The FM resonant accelerometer includes a tuning fork resonator having two tines with two degrees of freedom, such as an anti-phase and in-phase mode of vibration of the two tines, and an electrode arrangement coupled to the tines which has a capacitance as a nonlinear function of the displacement of the tines or a mechanical spring element with non-linear dependence of stiffness versus stress.

The scope of the invention also includes a method of operation and self-calibration of a frequency modulation inertial measurement unit (FM IMU). The method includes the steps of continuously or periodically driving an FM accelerometer into anti-phase resonance by means of an electronic feedback system, which includes tracking of the resonant frequency, generating a measure of input acceleration of the FM IMU from the driven FM accelerometer as an FM signal of the accelerometer, demodulating the FM signal of the accelerometer to measure the input acceleration by using a phase locked loop (PLL) or zero crossing detection, periodically switching a DC bias voltage applied to the FM accelerometer parallel plate electrodes, which have opposite orientations and which are coupled to the accelerometer tuning forks between two fixed values to periodically switch the accelerometer scale factor (in Hz/g) between two different output values of equal magnitude but opposite polarity of an output signal, and signal processing the two output values of the output signal to decouple the effect of temperature and other common mode errors from true acceleration, whereby intentional switching of the scale factor results in self-calibration of the FM accelerometer.

The intentional switching of the scale factor which results in self-calibration of the FM accelerometer is applied to one tuning fork at a time or simultaneously to both tuning forks to provide continuous self-calibrated measurement of the true acceleration without interruption.

The FM accelerometer is capable of amplitude modulated (AM) operation and further includes the switching of the FM accelerometer between amplitude modulated (AM) mode of operation and FM mode by operation of a control system.

The FM gyroscope is capable of amplitude modulated (AM) operation and the method further includes switching the FM gyroscope between an FM rate measuring mode, AM rate measuring mode, and Whole Angle mode of operation by operation of a control system.

The step of continuously or periodically driving an FM accelerometer is implemented by velocity positive feedback (self-resonance), phase locked loop (PLL), or excitation using frequency band noise, impulse excitation.

The FM vibratory gyroscope and FM resonant accelerometer each have sensitive axes, and the method further includes the step of initially aligning the sensitive axes of the FM vibratory gyroscope and FM resonant accelerometer by a single lithography step when fabricated to provide high precision of the alignment between the sensitive axes and stability of the relative alignment of the sensitive axes over the environmental exposures and lifetime.

The method further includes the step of simultaneous signal processing of the FM gyroscope signal and two complimentary FM accelerometers allowing decoupling and elimination of the acceleration and vibration induced errors in the FM gyroscope.

The step of signal processing includes the step of simultaneous signal processing multiple FM signals produced by the resonant accelerometers to provide temperature self-sensing and self-calibration against temperature induced and other common mode measurement errors.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The disclosure can be better visualized by turning now to the following drawings wherein like elements are referenced by like numerals.

BRIEF DESCRIPTION OF THE DRAWINGS

FIG. 3b is a plan view of a layout of the accelerometer of FIG. 3a.

FIG. 9a shows a phase locked loop (PLL) implementation of the resonator 1 and 2 control and frequency-counting loops. FIG. 9b is a diagram of a closed loop resonator 1 and 2 operation followed by signal mixing and low bandwidth frequency count. FIG. 9c is a diagram of the use of periodic or intermittent excitation with energy pulses, noise, or other signal sources.

The disclosure and its various embodiments can now be better understood by turning to the following detailed description of the preferred embodiments which are presented as illustrated examples of the embodiments defined in the claims. It is expressly understood that the embodiments as defined by the claims may be broader than the illustrated embodiments described below

DETAILED DESCRIPTION OF THE PREFERRED EMBODIMENTS

Figure 1:
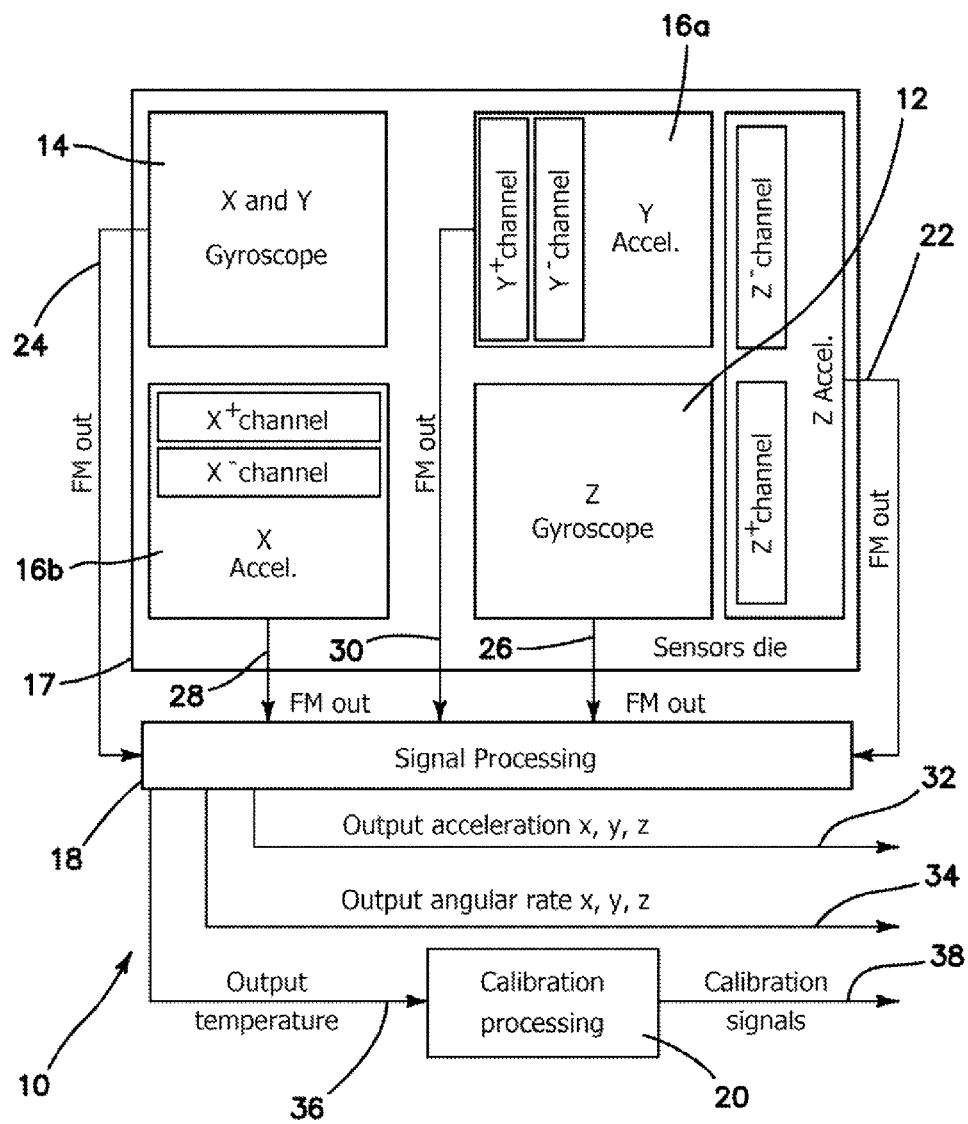
FIG. 1: MEMS FM IMU architecture comprising FM gyroscopes FM accelerometers, signal processing and calibration algorithm.

What is disclosed is the first multi-axis MEMS IMU 10 with an inherently FM-based, quasi-digital architecture and including a method of operation and self-calibration of the same. FIG. 1 is a block diagram of a 3-axis IMU implementation which was realized as single-chip solution as a proof of concept, combining an ultra-high Q-factor z-axis FM gyroscope co-fabricated with two complementary high-resolution FM accelerometers (x and y axis). The illustrated embodiment shows a differential FM accelerometer using two acceleration sensitive tuning fork resonators equipped with negative electrostatic springs. IMU 10 is fabricated on a single die 17 and includes a z-axis MEMS gyroscope 12 to provide a Z+ and Z− channel FM acceleration output 22. Z-axis MEMS gyroscope 12 also provides an angular rate FM output 26. An x and y axis MEMS gyroscope 14 provides an FM angular rate output 24. Die 17 also includes a y MEMS accelerometer 16a with Y+ and Y− channel acceleration outputs provided as FM output 30. An x-axis MEMS accelerometer 16b with X+ and X− channel outputs are provided as FM acceleration output 28. FM outputs 22, 24, 26, 28 and 30 are input into a signal processor 18, whose outputs in turn include the x, y, z output accelerations 32, the x, y, z output angular rates 34, and an output temperature 36 of die 17. The output temperature 36 is input into a calibration processing circuit 20, whose outputs include calibration signals 38.

Figure 2A:
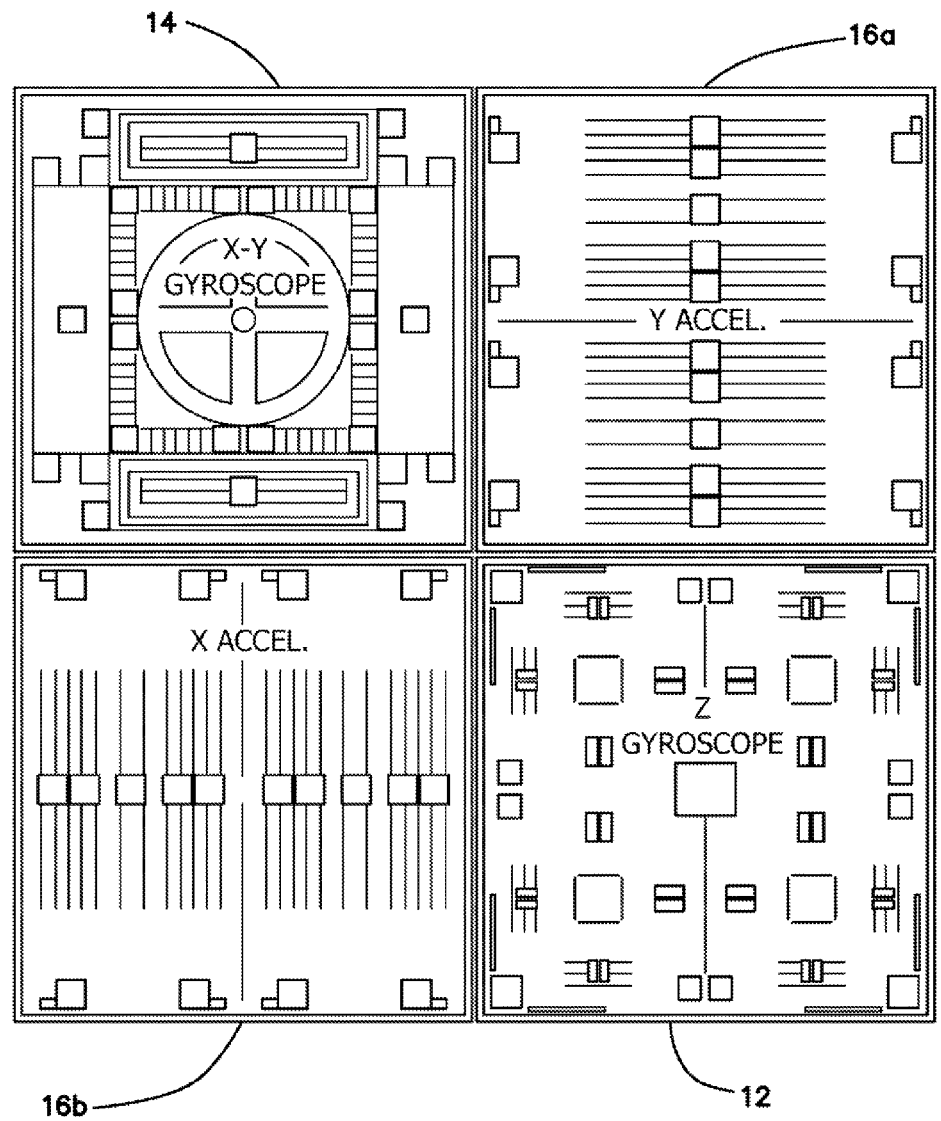
FIGS. 2a and 2b diagrammatically illustrate the single chip 3-axis FM IMU design and vacuum packaging concept of FIG. 1.
Figure 2B:
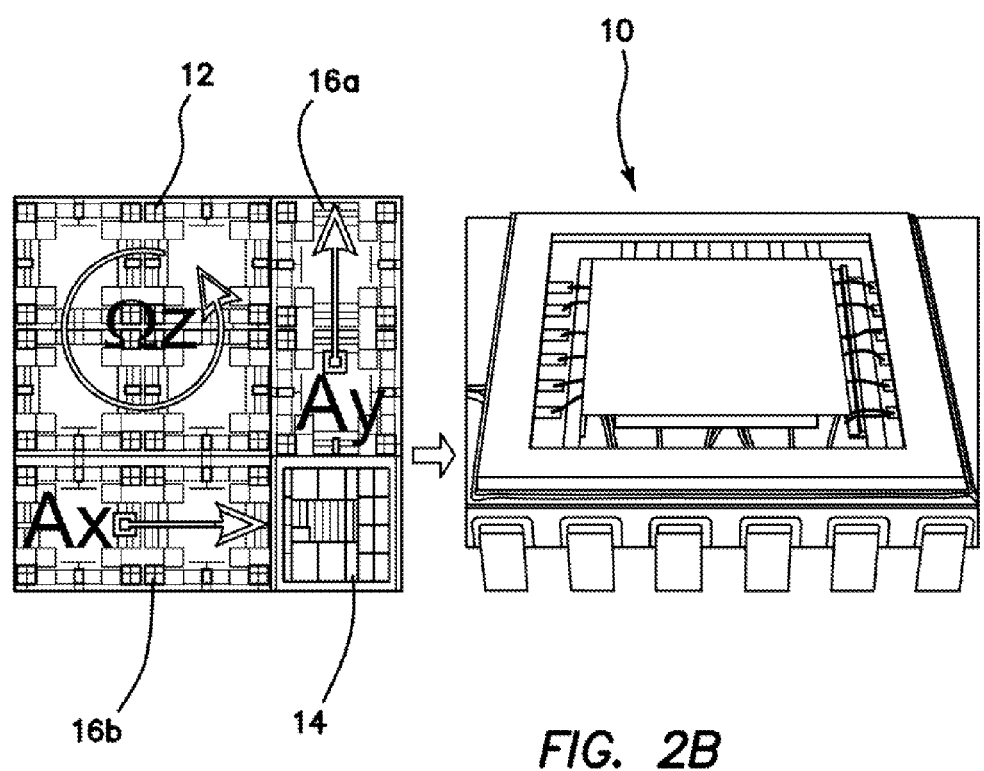

FIGS. 2a and 2b relate to a single chip 3-axis FM IMU layout design and vacuum packaging concept of FIG. 1. FIG. 2a is a conceptual layout plan and FIG. 2b is a photo of a fabricated SOI MEMS differential FM IMU 10.

Consider now the FM gyroscopes 12 and 14 in greater detail. The FM gyroscopes 12, 14 rely on tracking of the resonant frequencies of two high-Q mechanical modes of vibration in a MEMS vibratory gyroscope system to produce an inherently digital measurement of the input angular rate and temperature. Advantages of the FM instrumented gyroscope 12, 14 over the current state-of-the-art AM based gyroscopes include an extremely wide linear range, immunity to temperature variations, and robustness to external mechanical interferences and electromagnetic interference (EMI). The gyroscope 12, 14 can operate in three interchangeable modes: rate measuring FM mode, conventional rate measuring AM mode, and whole angle mode. Principle of operation of the FM gyroscope is well known in the art.

Turn now and consider the FM accelerometers 16a and 16b. Differential FM accelerometers 16a, 16b of the IMU 10 comprise two identical resonant accelerometers 40 and 42, each comprising a tuning fork resonator 40, 42 comprised of masses 46 and 48 with a plurality of springs 44 with an in-phase and an out-of-phase mode of vibration and capacitive electrodes 50 as shown in FIG. 3. Each of the two tuning fork resonators 40, 42 has two mechanical degrees of freedoms: namely in-phase and anti-phase. The anti-phase mode of the resonator 40, 42 is completely dynamically balanced, eliminating dissipation of energy due to linear and angular vibrations of the substrate. Because of this, the anti-phase mode demonstrates an ultra-high Q-factor, limited only by thermoelastic damping, resulting in high precision, high stability, and low phase noise for anti-phase oscillations. In contrast, the in-phase oscillation has a low Q-factor, which is limited by the anchor loss. Each coupled mass 46, 48 of the resonator 40, 42 features variable gap parallel plate electrodes 50 which create an electrostatic field when a tuning voltage (V) is applied for excitation. A negative electrostatic spring is created, with stiffness proportional to the tuning voltage squared and inversely proportional the electrode gap cubed. This makes the anti-phase natural frequency highly sensitive to the electrode gap. The frequency of the anti-phase resonant oscillation is a function of the in-phase displacement of the proof masses 46, 48 (tines). Electrodes 50 also include a detection subset of electrodes for measurement or output.

Figure 3A:
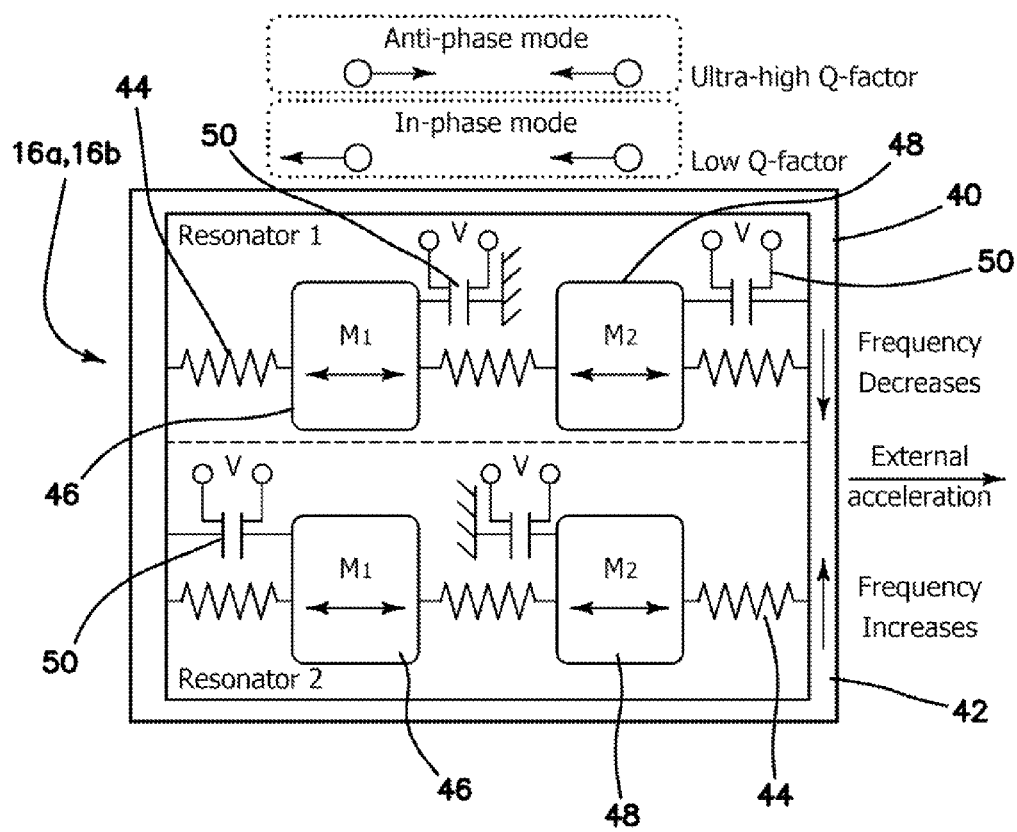
FIG. 3a is a diagram of the differential accelerometer of FIG. 1 using frequency modulation of the input acceleration.
Figure 3C:
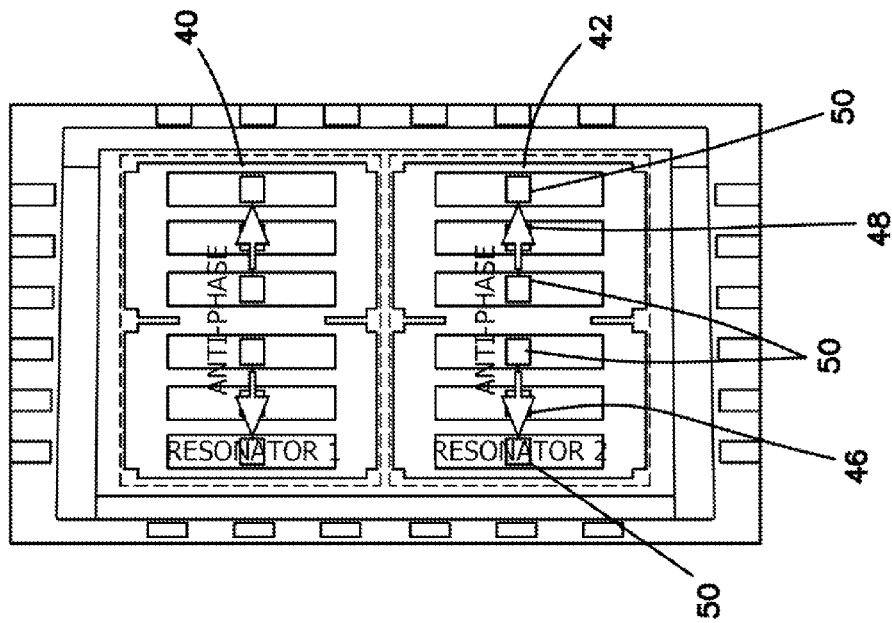
FIG. 3c illustrates a plan view of a chip mount of the layout of FIG. 3b.

The principle of operation of the differential FM accelerometer relies on tracking of the natural frequencies of the two anti-phase tuning fork resonators 40, 42 shown in FIG. 3a to produce a measurement and decoupling of the input acceleration and temperature. FIG. 3a shows the layout of the tuning masses 46, 48, each coupled to an excitation and detection capacitive electrode array 50 on each side of the masses 46, 48 in the pair of resonators 40, 42. The applied inertial acceleration produces the in-phase shift of proof masses 46, 48. This shift is detected by tracking the resonant frequency of the high Q-factor anti-phase mode and comparing it to a reference oscillator as shown in FIG. 3c. The relatively low Q-factor of the in-phase mode provides the fast step response, and wide bandwidth of the accelerometer 16a, 16b. At the same time, the ultra-high Q-factor of the balanced anti-phase mode of FIG. 3c guarantees ultra-high frequency resolution and stability, resulting in excellent accelerometer performance. Thus the combination of the high Q-factor of the anti-phase mode and the low Q-factor of the in-phase mode eliminates the noise-versus-bandwidth tradeoff of conventional vibratory accelerometers. Moreover, FM sensor architectures are known to be robust against mechanical and electromagnetic interferences.

Figure 4:
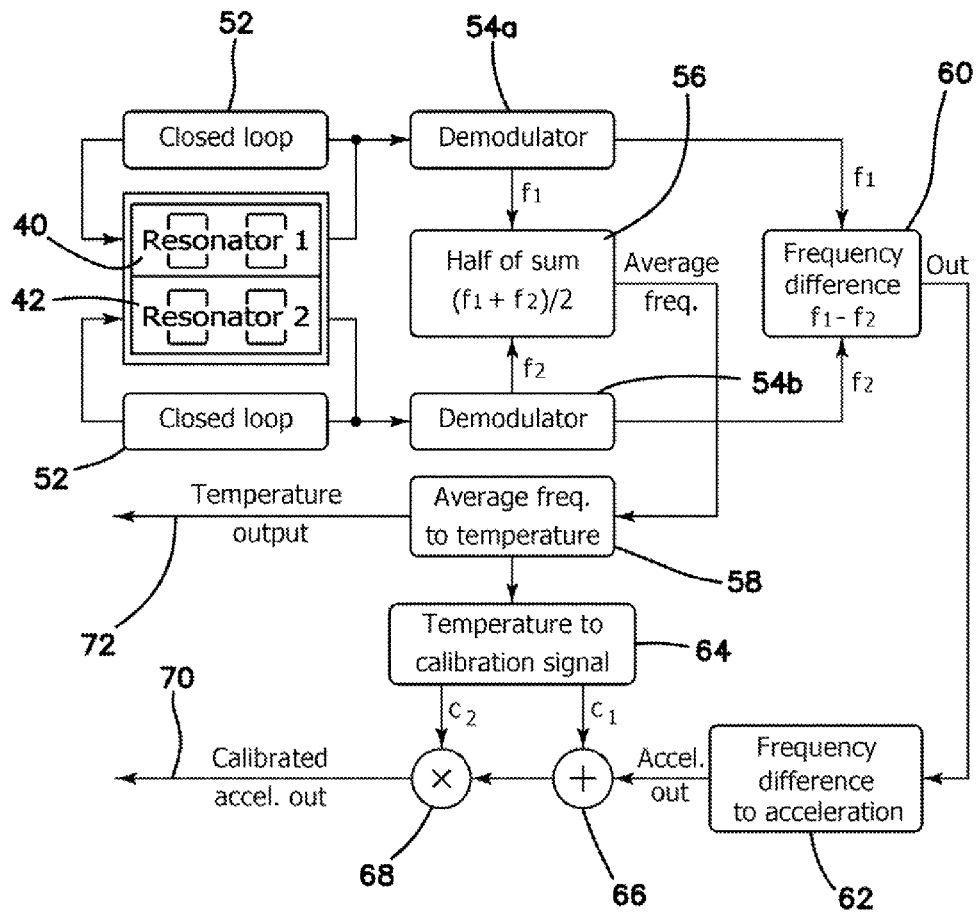
FIG. 4 is a diagram illustrating the functional operation of the differential FM accelerometer, signal processing, and self-calibration.

The temperature self-calibration of the accelerometer 16a, 16b, based on the mirrored relative positions of the two resonators 40, 42, ensures identical frequency shifts, but with opposite signs. The signal processing tracks the frequency difference between the two resonant accelerometers 16a, 16b, enabling differential measurement of acceleration as diagrammatically depicted in FIG. 4. Resonators 40, 42 are driven into anti-phase resonance using closed loop control circuitry 52 provide an output to demodulators 54a, 54b. The output of demodulators 54a, 54b is the output frequency, $f_1$, $f_2$, of resonators 40, 42 respectively. The average of output frequency, $f_1$, $f_2$, of resonators 40, 42 is generated in summing/dividing circuit 56 and provided as an input to circuit 58, which converts the average frequency to the temperature output signal 72 of die 17 or more appropriately of resonators 40, 42. The native temperature coefficient of frequency (TCF) of single crystal silicon has a well know linear dependency on temperature, enabling direct temperature self-sensing. The output frequency, $f_1$, $f_2$, of resonators 40, 42 is also provided to differencing circuit 60, whose output $f_1-f_2$ is provided to a conversion circuit 62 which converts $f_1-f_2$ to a measure of acceleration of IMU 10. The sensed temperature from circuit 58 is converted in conversion circuit 64 into system calibration signals, one of which, is added in adder 66 to the sensed acceleration output from circuit 62 and the other of which, $c_2$, is multiplied in multiplier 68 to provide a calibrated acceleration output signal 70. In this approach, the FM accelerometer 16a, 16b provides a quasi-digital measurement of the input acceleration as well as direct measurement of the accelerometer temperature. The accelerometer 16a, 16b becomes its own thermometer, eliminating thermal lags and hysteresis.

Figure 5:
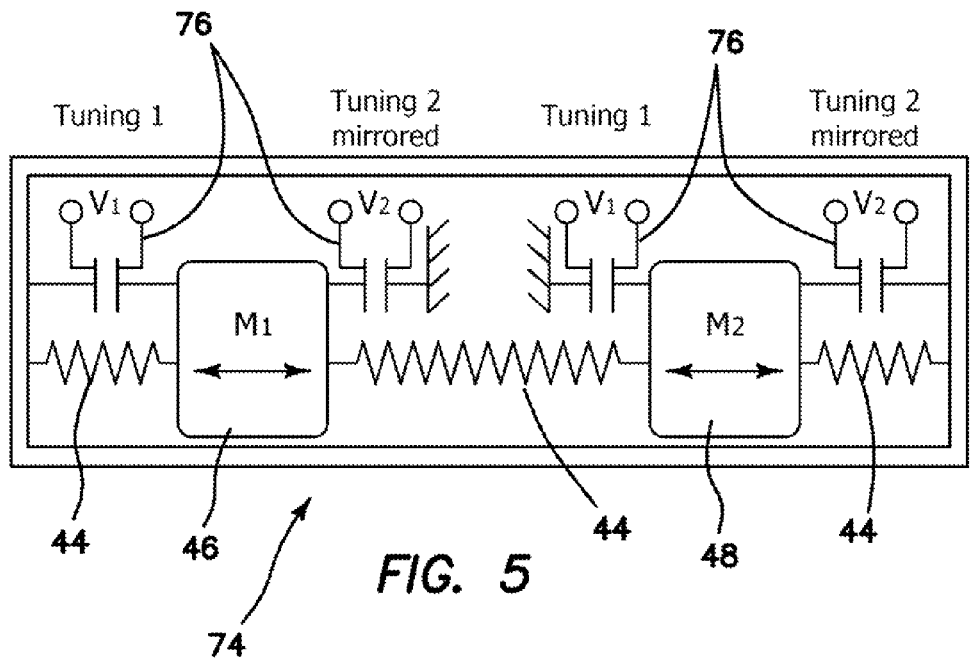
FIG. 5 is a conceptual diagram of a single tuning fork (non-differential FM accelerometer with self-calibration by scale factor polarity reversal.

An additional method of accelerometer drift self-calibration is based on using of only one (Le non-differential) tuning fork resonator 74 with mirrored parallel plates 76, masses or tines 46, 48 and springs 44 as shown in FIG. 5. Switching of the DC tuning voltage between the two sets of opposing parallel plates 76 reverses the polarity of the accelerometer scale factor. This enables the detection and decoupling of the input acceleration and accelerometer drift by measuring the same acceleration twice with opposite scale factors, and subtracting the measurements. This method of self-calibration against drift yields a single tuning fork FM accelerometer 74 with stable output, not affected by aging or environmental exposures.

Turn now and consider signal processing and calibration in greater detail. As illustrated in FIG. 1 signal processing for the disclosed FM IMU 10 operates on the output signals from the FM gyroscopes 12, 14 and FM accelerometers 16a, 16b and processes them to extract true inertial inputs. The signal processing algorithm in processor 18 also detects and decouples the input acceleration, angular rate and the sensors' (accelerometer and gyroscope) temperature. The self-calibration algorithm produces inertial signals calibrated against the effects of cross axis sensitivities, temperature, and drifts.

Figure 6B:
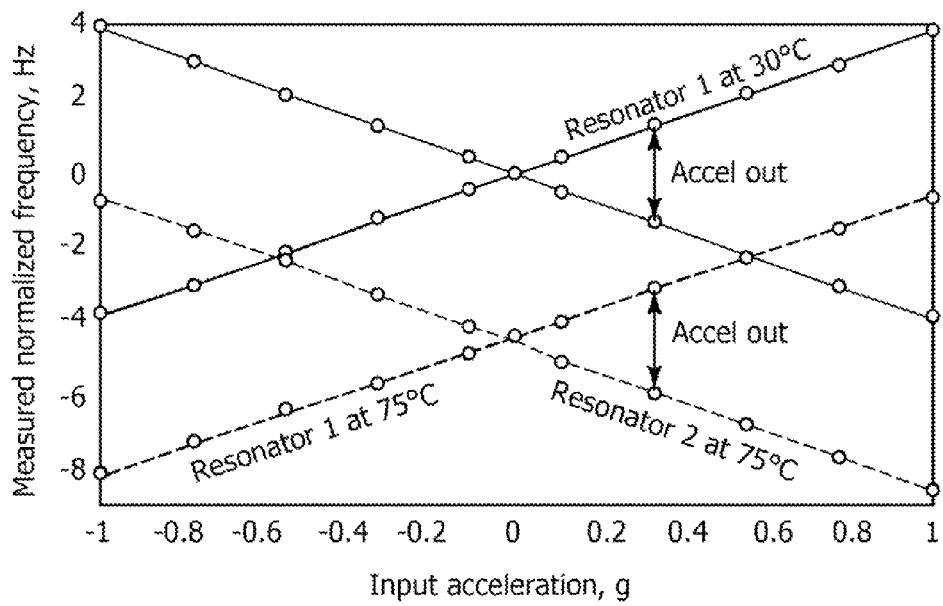
FIG. 6b is a graph of the measured resonant frequencies $f_2$ for the two resonators as a function of the input acceleration for 30° C. and 75° C.
Figure 6A:
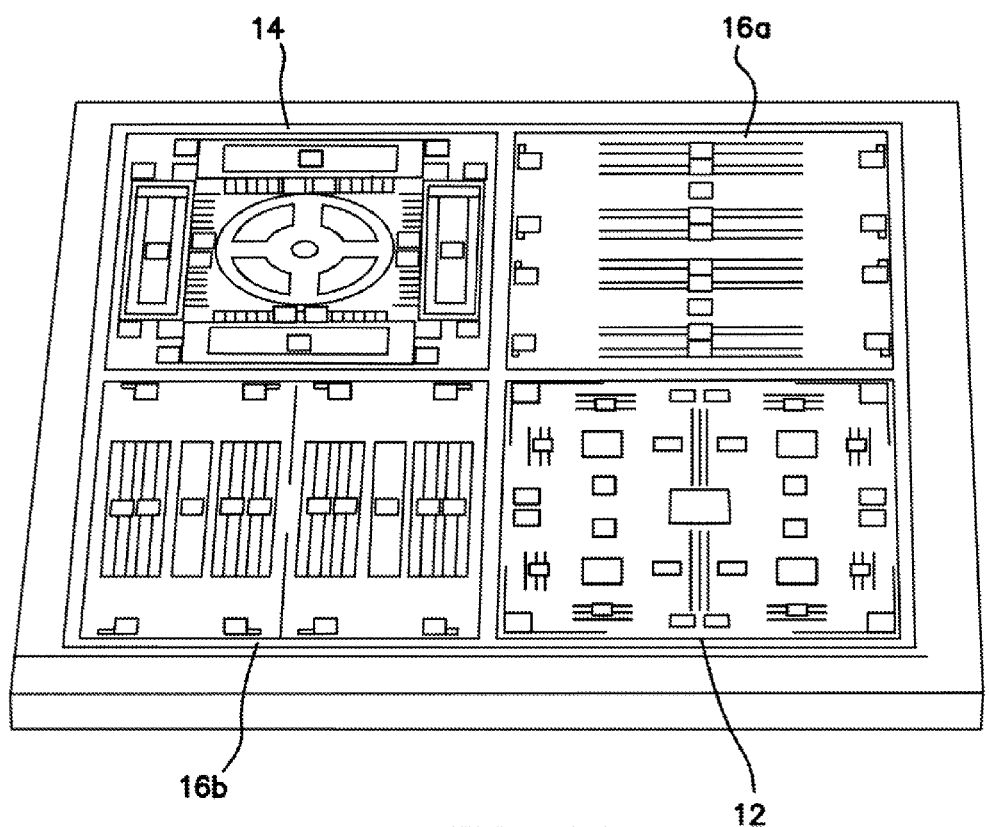
FIG. 6a is a photograph of an FM IMU prototype with X, Y gyroscope, Z gyroscope, and X and Y accelerometers; the die size is approximately 9 mm.

Several different physical layout implementations of the disclosed FM gyroscope 12, 14, FM accelerometers 16a, 16b as well as FM IMU concepts in general have been considered, implemented, fabricated, and characterized. It must be understood that the illustrated embodiment is one of many different implementations that could be fabricated according to well known design choices. A basic physical layout of the FM IMU concept is shown in FIGS. 2a and 6a. This IMU layout comprises a single proof mass x/y gyroscope 14, a high performance z-axis gyroscope 12, and x and y axis accelerometer 16a, 16b. Measured resonant frequencies $f_1$, $f_2$ for the two resonators 40, 42 as a function of the input acceleration for 30.degree. C. and 75° C. is graphed in FIG. 6b. Differential frequency split $f_1-f_2$ is invariant to the temperature. The measured acceleration responses for 30° C. and 75° C. using the differential frequency split is graphed in FIG. 6c.

Figure 3B:
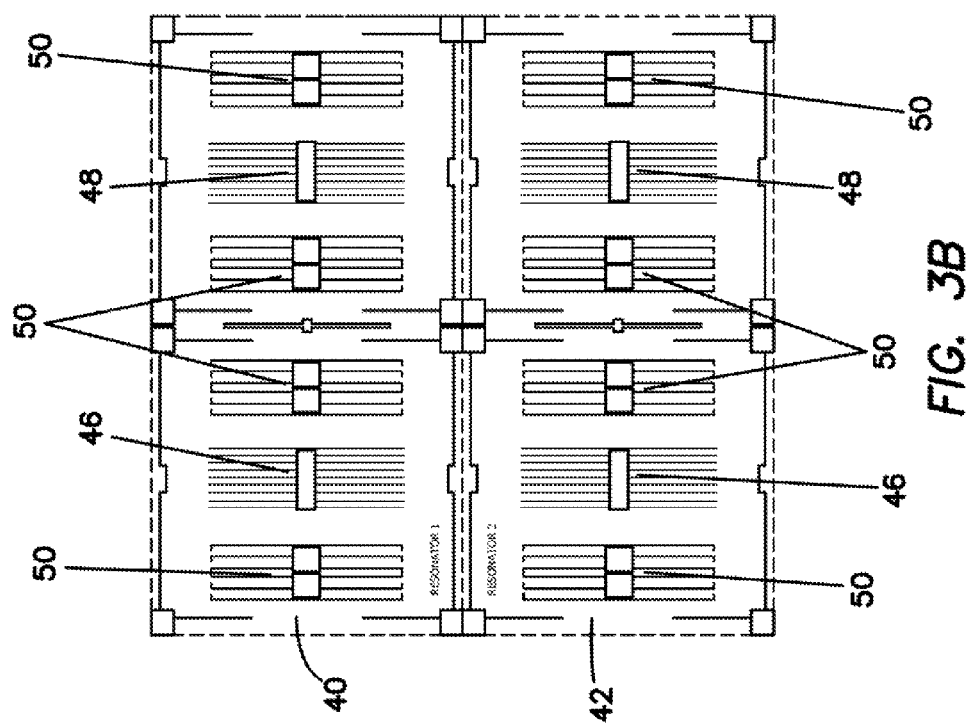

The fabrication of prototypes of FM accelerometers 16a, 16b and FM gyroscopes 12, 14 was done using an in-house, wafer-level, single-mask process using silicon-on-insulator (SOI) wafers with a 100 μm thick device layer and a 5 μm buried oxide layer. After patterning photoresist with the device mask, the wafers were subjected to a deep reactive ion etching (DRIE) using a Surface Technology Systems (STS) Advanced Silicon Etching (ASE) tool. The minimal feature of 5 μm was used to define capacitive gaps. The perforated structures were released using a timed 20% HF acid bath. An optical photograph of a fabricated FM accelerometer 16a, 16b is shown in FIG. 3b. For characterization the device was packaged using ceramic DIP-24 packages and wire bonded as shown in FIG. 3c.

Figure 6C:
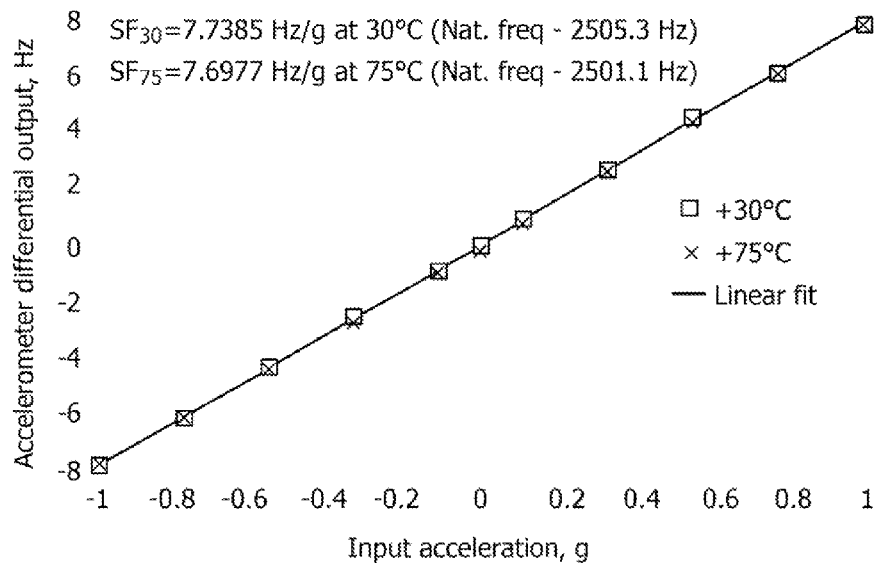
FIG. 6c is a graph of the measured acceleration responses for 30° C. and 75° C. using the differential frequency split. The differential FM accelerometer 16a, 16b at 30° C. and 75° C., demonstrates self-calibration to temperature. There is less than 0.5% response fluctuation.
Figure 7:
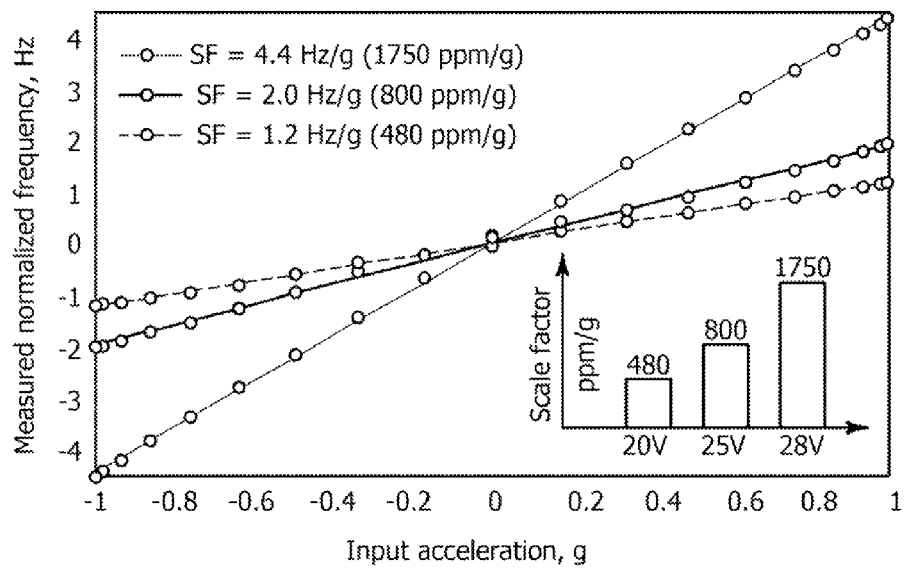
FIG. 7 is a graph of measured acceleration response of the FM accelerometer prototype for 20 V, 25 V, and 30 V DC bias voltage. The inset shows the scale factor vs. tuning voltage dependency.
Figure 8:
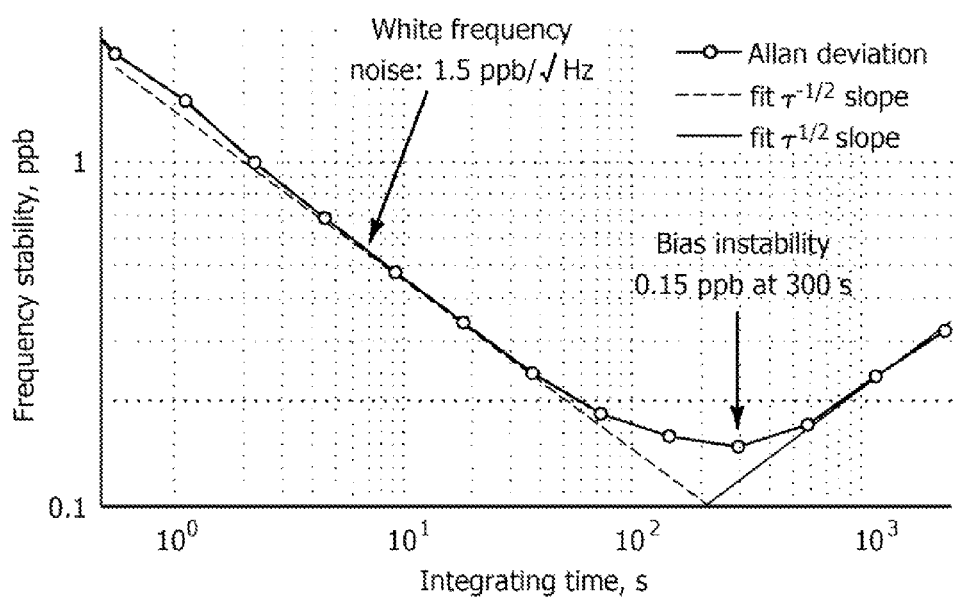
FIG. 8 is a graph of the measured Allan deviation of the vacuum sealed high-Q tuning fork resonator, showing frequency stability of 0.15 ppb at 300 seconds with frequency white noise of 1.5 ppb/√Hz. This translates into acceleration bias instability of 0.1 µg and a velocity random walk of 10 µg/√Hz.

A fabricated 100 μm SOI accelerometer 16a, 16b with FM principle of operation was used for the experimental characterization. The differential accelerometer 16a, 16b comprised of two tuning forks was tested by measuring response to the gravity field using an automated tilt stage. The natural frequencies of both tuning fork resonators 40, 42 were recorded for each inclination. To investigate the temperature self-calibration of the proposed accelerometer 16a, 16b, the same experiment was performed at temperatures of 30° C. and 75° C. for the input range of −±1 g as shown by the graph of FIG. 6b. The measured split between the nominally equal natural frequencies was directly proportional to the input acceleration as shown in the graph of FIG. 6c. Experimental characterization of the differential FM accelerometer 16a, 16b revealed less than 0.5% scale-factor change between 30° C. and 75° C. temperatures, FIG. 6c. This experiment was performed for three different tuning voltages (20, 25 and 20 V), revealing scale factors of 4.4, 2.0 and 1.2 Hz/g as shown in the graph of FIG. 7. The noise performance of the FM-based accelerometer 16a, 16b is limited by the frequency stability of the anti-phase mode of the tuning fork resonator 40, 42. We demonstrated a frequency stability of 0.15 ppb at 300 seconds with frequency white noise of 1.5 ppb/√Hz. Using the measured scale factor of 4 Hz/g, we project that the FM IMU 10 can achieve an acceleration bias instability of better than 0.1 μg and a velocity random walk (VRW) of less than 1 μg/√Hz, FIG. 8. This frequency stability in combination with silicon TCF −33 ppm/° C. provides a 0.00025° C. (0.25 mK) precision of temperature self-sensing and self-calibration.

Figure 9A:
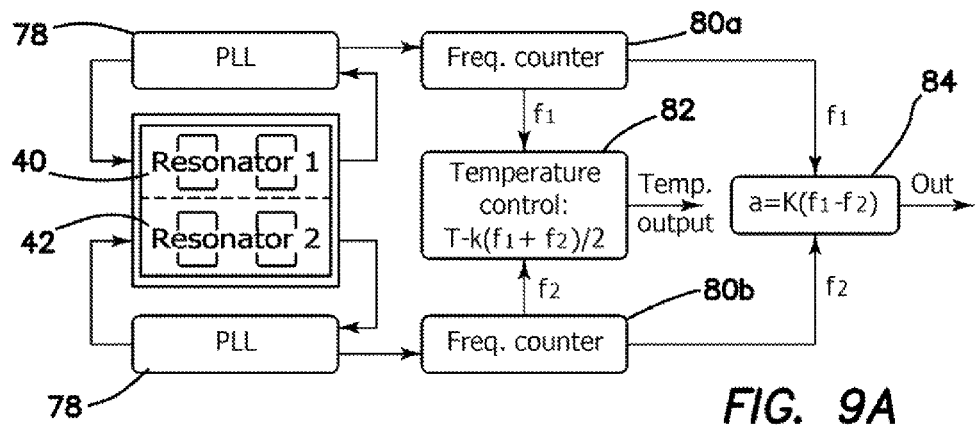
FIGS. 9a-9c are diagrams of various types of implementations of the differential FM accelerometer signal processing.
Figure 9B:
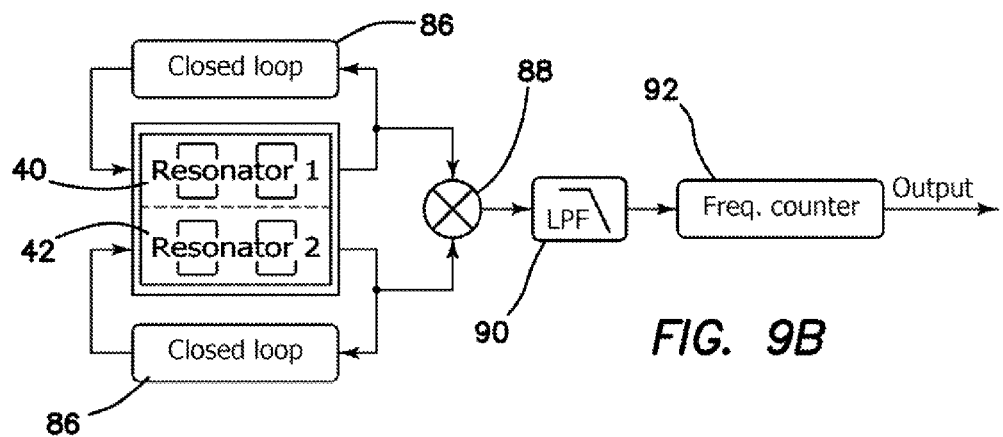
Figure 9C:
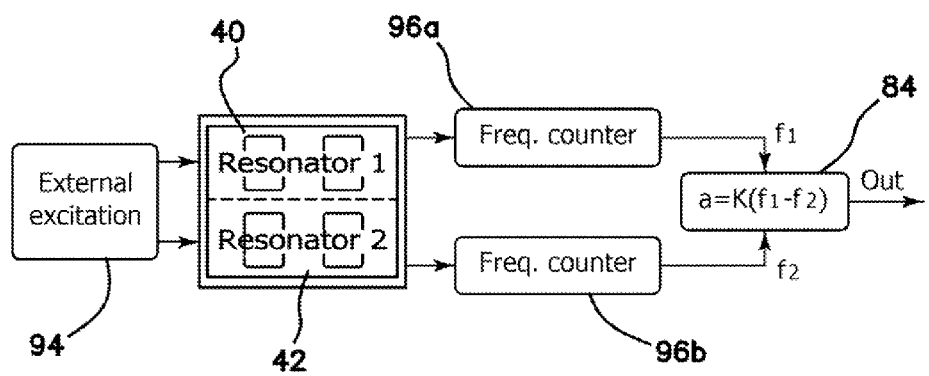

Examples of various alternative implementations of the disclosed FM based accelerometer signal processing are shown in FIGS. 9a-9c, which is by no means exhaustive of the possibilities by which the claimed invention may be realized. In the phase locked loop implementation of FIG. 9a resonators 40, 42 are held into anti-phase mode resonance by phase locked loop circuits 78 whose output is coupled to a frequency counter 80a and 80b for resonators 40 and 42 respectively. The output of counter 80a is the frequency $f_1$ of resonator 40 and the output of counter 80b is the frequency $f_2$ of resonator 42. These frequencies, $f_1$ and $f_2$ are provided to temperature control conversion circuit 82 in which the frequencies are averaged and weighted by a factor, k, indicative of the temperature output. The frequencies, $f_1$ and $f_2$ are also provided as the acceleration output as determined by a weighted frequency split or differential by conversion circuit 84, namely $a=K(f_1-f_2)$.

A closed loop controlled accelerometer 16a, 16b is diagrammed in the embodiment of FIG. 9b. Resonators 40, 42 are controlled by closed loop circuits 86, and the resonator output provided to multiplier 88. The output of multiplier is conditioned by low pass filter 90 and the frequency split or differential is measured by frequency counter 92, whose output is the differential acceleration signal, $a=(f_1-f_2)$.

An excitation controlled accelerometer 16a, 16b, using periodic or intermittent excitation with energy pulses, noise, or other signal sources, is diagrammatically depicted in FIG. 9c. A source of external excitation voltage 94 is used to excite resonators 40, 42. Their respective outputs are coupled to frequency counters 96a and 96b respectively, to provide the signals, $f_1$ and $f_2$. The digitized frequencies are then provided to conversion circuit 84, whose output is a weighted measure of the frequency split or differential between resonators 40 and 42 or acceleration, namely $a=K(f_1-f_2)$.

Many alterations and modifications may be made by those having ordinary skill in the art without departing from the spirit and scope of the embodiments. Therefore, it must be understood that the illustrated embodiment has been set forth only for the purposes of example and that it should not be taken as limiting the embodiments as defined by the following embodiments and its various embodiments.

Therefore, it must be understood that the illustrated embodiment has been set forth only for the purposes of example and that it should not be taken as limiting the embodiments as defined by the following claims. For example, notwithstanding the fact that the elements of a claim are set forth below in a certain combination, it must be expressly understood that the embodiments includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the embodiments is explicitly contemplated as within the scope of the embodiments.

The words used in this specification to describe the various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the embodiments.

We claim:

1. A multi-axis microelectromechanical-systems (MEMS) inertial measurement unit (IMU) in a vacuum sealed single packaged device comprising:
   a single silicon chip;
   an FM vibratory gyroscope for generating frequency modulated (FM) gyroscopic output signals fabricated in the silicon chip using silicon MEMS technologies as part of the vacuum sealed single packaged device;
   an FM resonant accelerometer for generating frequency modulated (FM) accelerometer output signals fabricated in the silicon chip using silicon MEMS technologies as part of the vacuum sealed single packaged device; and
   a signal processor coupled to the an FM vibratory gyroscope and to the FM resonant accelerometer for receiving the frequency modulated (FM) gyroscopic output signals and the frequency modulated (FM) accelerometer output signals, the signal processor generating simultaneous and decoupled measurement of input acceleration, input rotation rate, and temperature and/or temperature distribution within the IMU, self-calibration of the biases and scale factors of the IMU and its support electronics against temperature variations and common mode errors, and reduction of the cross axis sensitivity by reducing acceleration errors in the gyroscope and rotation errors in the accelerometer,
   wherein the FM resonant accelerometer comprises:
      a tuning fork resonator having two tines with an antiphase and in-phase mode of vibration; and
      a plurality of variable gap parallel plate electrodes coupled to the two tines to produce a negative electrostatic spring, where external acceleration causes a shift of both tines with in-phase motion, which changes an effective gap in the parallel plate electrodes thereby changing the effective stiffness for each tine, where the change of stiffness induces a change of an anti-phase resonant frequency, and where the change of the anti-phase resonant frequency is an FM measure of the input acceleration.

2. The MEMS IMU of claim 1 where the FM vibratory gyroscope generates a differential FM signal including two splitting frequencies with inherent self-calibration against temperature and common mode errors, where the sum of the two splitting frequencies is proportional to the sensor temperature and the difference between the two splitting frequencies provides a measure of the input rate of rotation.

3. The MEMS IMU of claim 1 where the FM resonant accelerometer generates a differential FM signal including two splitting frequencies with inherent self-calibration against temperature and common mode errors, where the sum of the two splitting frequencies is proportional to the sensor temperature and the difference between the two splitting frequencies is a measure of the input acceleration.

4. The MEMS IMU of claim 1 where the accelerometer includes two sets of variable gap parallel plate electrodes having opposite orientations so that interchangeable operation of the two sets of parallel plate electrodes reverses the polarity of an accelerometer scale factor, enabling self-calibration of bias drift by means of a differential measurement arising from the interchangeable operation of the two sets of parallel plate electrodes.

5. The MEMS IMU of claim 1 where the two tines are momentum balanced so that the anti-phase mode of vibration generates quality factors above 1,000,000 and frequency stability below 1 ppb, enabling very good FM detection resolution and stability for the gyroscope and accelerometer.

6. The MEMS IMU of claim 1 where in-phase mode of vibration of the accelerometer is arranged and configured to have a quality factor below 1,000 by providing energy dissipation through the chip or through the use of a feedback system to provide wide bandwidth and fast response time.

7. The MEMS IMU of claim 1 where the accelerometer include two tuning forks, each of the two tuning forks having the same sensitive axis, which is the axis of the anti-phase mode vibrations, but polar opposite scale factors by reversed orientation of the negative electrostatic spring produced by the parallel plate electrodes, where simultaneous and coordinated operation of the two tuning forks yields a differential FM accelerometer in which the two output frequencies are used to detect acceleration and sensor temperature at the same time, and to eliminate the effect of temperature and common mode errors on the accelerometer output.

8. MEMS IMU of claim 1 where FM resonant accelerometer comprises:
   a tuning fork resonator having two tines with an anti-phase and in-phase mode of vibration of the two tines; and
   an electrode arrangement coupled to the tines which has a capacitance as a nonlinear function of the displacement of the tines or a mechanical spring element with non-linear dependence of stiffness versus stress.

9. A multi-axis microelectromechanical-systems (MEMS) inertial measurement unit (IMU) comprising:

a silicon chip;

an FM vibratory gyroscope capable of generating frequency modulated (FM) gyroscopic output signals fabricated in the silicon chip using silicon MEMS technologies;

an FM resonant accelerometer capable of generating frequency modulated (FM) and amplitude modulated (AM) accelerometer output signals fabricated in the silicon chip using silicon MEMS technologies;

a control system configured to switch the FM accelerometer between an FM mode of operation and an AM mode of operation; and a signal processor coupled to the an FM vibratory gyroscope and to the FM resonant accelerometer for receiving the frequency modulated (FM) gyroscopic output signals and the frequency modulated (FM) accelerometer output signals, the signal processor generating decoupled measurements of input acceleration, input rotation rate, and temperature and/or temperature distribution within the IMU, self-calibration of the biases and scale factors of the IMU and its support electronics against temperature variations and common mode errors, and reduction of the cross axis sensitivity by reducing acceleration errors in the gyroscope and rotation errors in the accelerometer.

* * * * *